United States Patent [19]

Meister

[11] Patent Number: 4,922,965

[45] Date of Patent: May 8, 1990

[54] PNEUMATIC SOLENOID VALVE

[75] Inventor: Jack B. Meister, Cedar Knolls, N.J.

[73] Assignee: Beta Mfg. Co., Warren, Mich.

[21] Appl. No.: 313,948

[22] Filed: Feb. 22, 1989

[51] Int. Cl.$^5$ .................... F15B 13/044; F16K 31/06
[52] U.S. Cl. ............................ 137/625.65; 251/129.21
[58] Field of Search ............... 137/625.65; 251/129.21

[56] References Cited

U.S. PATENT DOCUMENTS

| | | | |
|---|---|---|---|
| 2,886,063 | 5/1959 | Ray | 137/625.27 |
| 3,459,404 | 8/1969 | Wisniewski | 251/129.21 |
| 3,550,632 | 12/1970 | Noakes et al. | 251/129.21 X |
| 3,608,585 | 9/1971 | Huntington | 137/625.65 |
| 4,582,088 | 4/1986 | Cook et al. | 137/625.65 |
| 4,753,416 | 6/1988 | Inagaki et al. | 137/628.65 X |

FOREIGN PATENT DOCUMENTS 1930447 1/1970 Fed. Rep. of
Germany ........................ 137/625.65

2321021 11/1974 Fed. Rep. of
Germany ........................ 137/628.65

Primary Examiner—Gerald A. Michalsky
Attorney, Agent, or Firm—Barnes,Kisselle,Raisch, Choate, Whittemore & Hulbert

[57] ABSTRACT

A solenoid valve for controlling pneumatic vacuum or pressure comprising a body having a bore. A first passage intersects one end of the bore. The bore defines a first seat adjacent the one end. The body has a second passage intersecting the bore intermediate its ends and a third passage. A coil surrounds a core. The core has a fourth passage therethrough with a second seat at one end. A tube provides communication between the other end of the fourth passage and the third passage. A single plunger is provided in the bore and has a first valve at one end adapted to engage the first seat and a second valve at the other end adapted to engage the second seat.

2 Claims, 4 Drawing Sheets

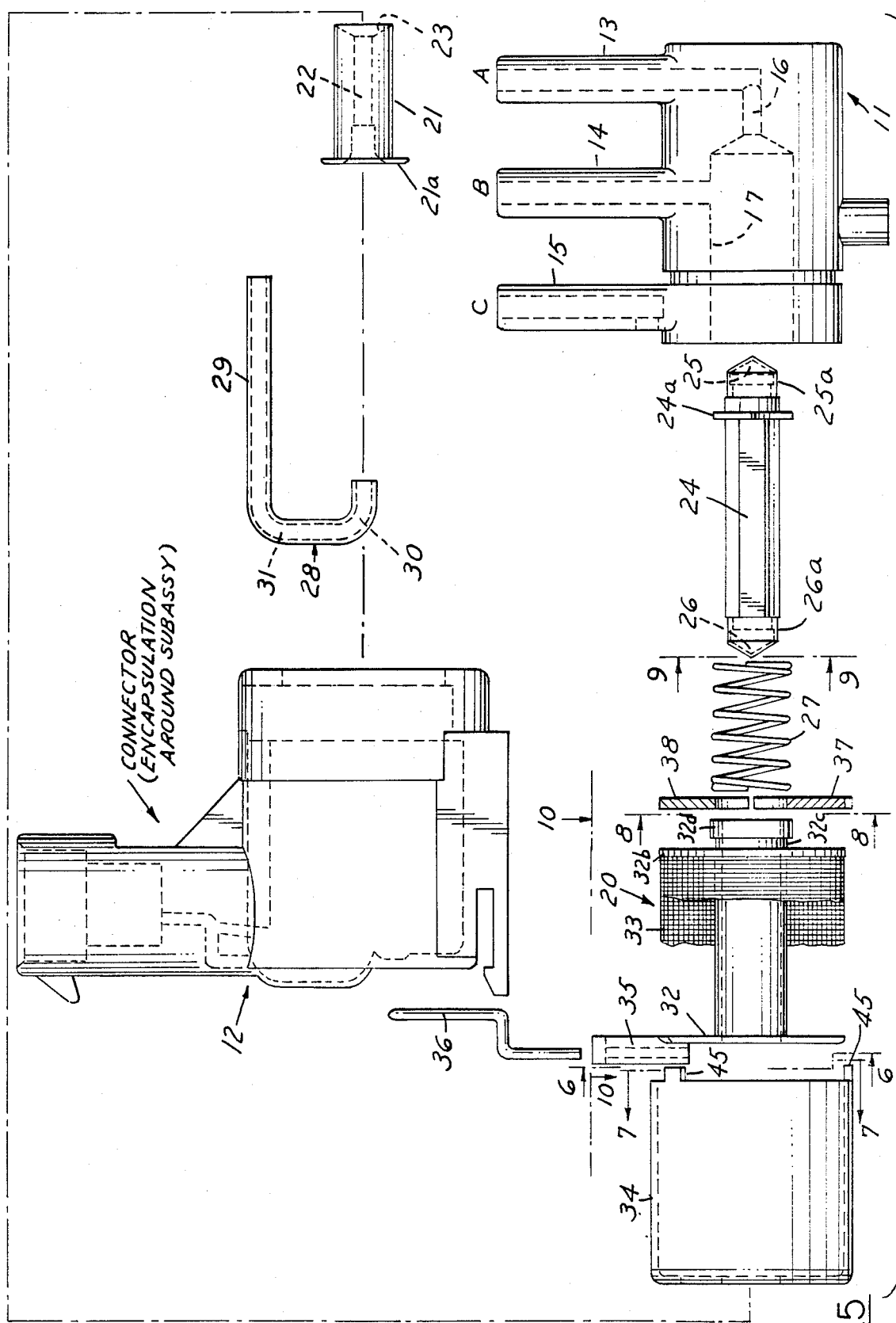

4,922,965

PNEUMATIC SOLENOID VALVE

This invention relates to pneumatic solenoid valves.

BACKGROUND AND SUMMARY OF THE INVENTION

In the control of various devices in automotive vehicles and the like, it is common to utilize selectively operated valves to control vacuum or pressure. One type of valve utilized for these purposes is a three port vacuum solenoid valve. When utilized in connection with automotive vehicles, stringent performance requirements are required including temperature limits of operation, such as an operating range over from minus −20° centigrade to +120° centigrade, vacuum and pressure limits of operation, resistant to mechanical shock, electrical capabilities utilizing direct current, functional limits of operation, vibration resistance, resistance to fluids and vapors including gasoline, engine coolant, engine oil, transmission fluid, brake fluid and windshield washer solvent, salt spray, humidity exposure and internal corrosion. In addition, any valve ports must withstand mechanical forces and the electrical terminals must withstand static forces. With respect to performance, it is necessary that such vacuum solenoid valves have specific requirements for vacuum operation including pull-in, drop-out, leakage and flow.

In one type of vacuum solenoid valve of the three port type currently used, the valve comprises three ports and a coil with a core. A plunger within the coil extends into the portion of the body having the ports and supports opposed valves that are movable between spaced seats in the body. In such an arrangement, a greater number of parts are required and alignment of the sealing surfaces is difficult. Furthermore, in operation, the plunger stops at a port face such that the plunger does not reach the magnetic pole face, thereby leaving a residual magnetic air gap that causes higher reluctance in the magnetic circuit and thereby reduces the available mechanical force for sealing. Further, since the plunger is located within the coil, a spring for returning the plunger is positioned within a cavity in both the plunger and the core and this reduction in the magnetic material (iron) further causes higher reluctance in the magnetic circuit and further reduces the available mechanical force for sealing. Finally, this prior arrangement has high fabrication costs and labor costs.

Among the objectives of the present invention are to provide a pneumatic solenoid valve which meets the desired requirements and has improved endurance; improved alignment of sealing surfaces; less reluctance and greater mechanical force for sealing; results in more positive action; utilizes fewer parts; is less costly to fabricate and can be manufactured with greater productivity.

In accordance with the invention, the pneumatic solenoid valve comprises a body having a bore and a first passage intersecting one end of the bore. The bore defines a first seat adjacent the one end. The body has a second passage intersecting the bore intermediate its ends and a third passage. A coil surrounds a core. The core has a fourth passage therethrough with a second seat at one end. A tube provides communication between the other end of the fourth passage and the third passage. A single plunger is provided in the bore and has a first valve at one end adapted to engage the first seat and a second valve at the other end adapted to engage the second seat.

DESCRIPTION OF THE DRAWINGS

FIG. 5 is an exploded view of the parts of the vacuum solenoid valve.

DESCRIPTION

Figure 1:
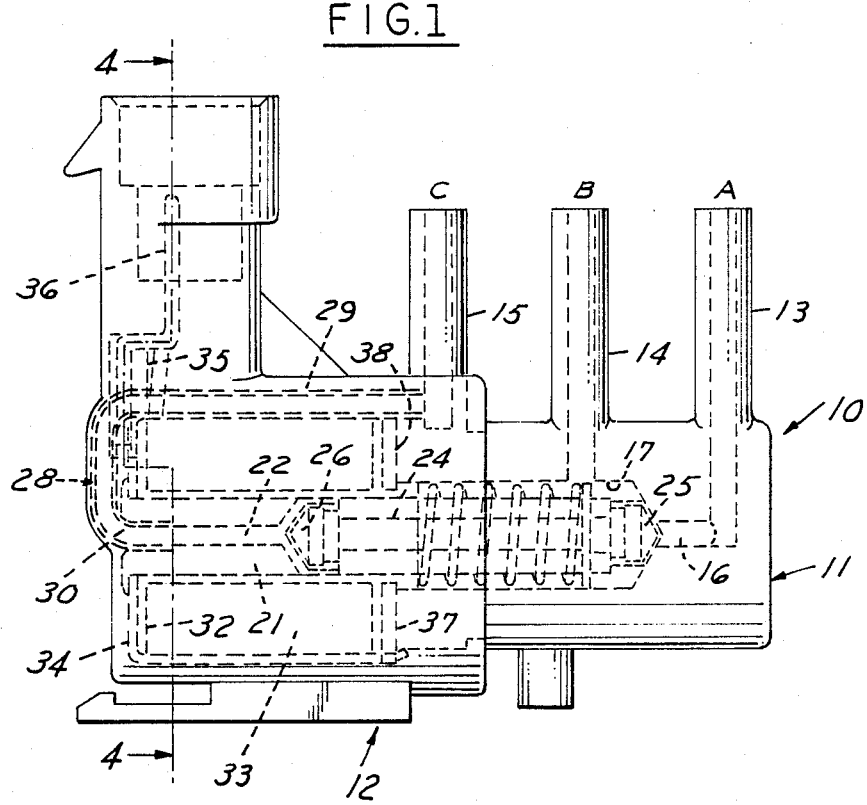
FIG. 1 is an elevational view of a vacuum solenoid valve embodying the invention.
Figure 4:
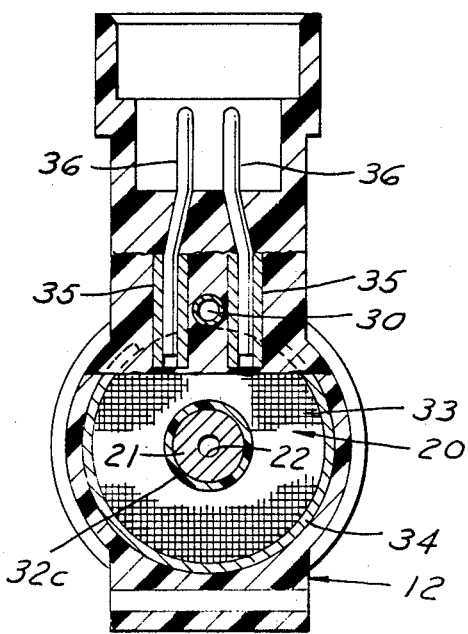
FIG. 4 is a sectional taken along the line 4—4 in FIG. 1.
Figure 2:
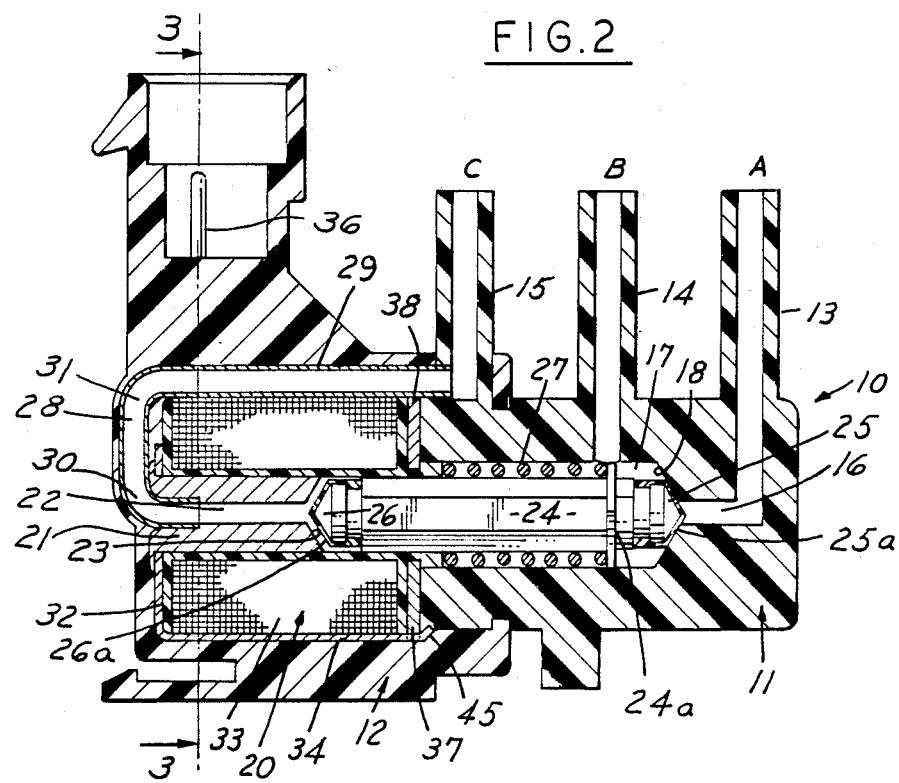
FIG. 2 is a longitudinal sectional view through the solenoid valve shown in FIG. 1.
Figure 3:
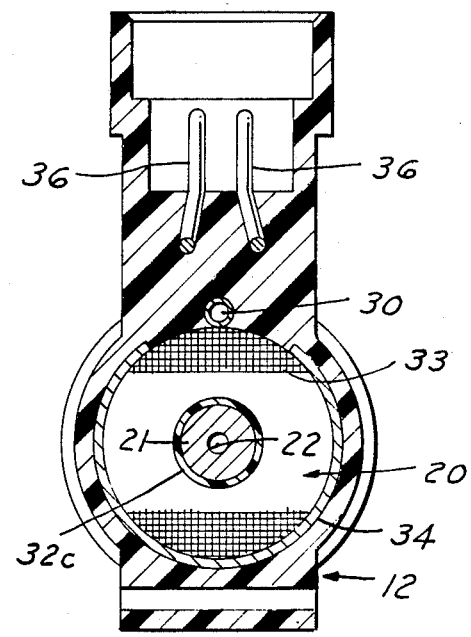
FIG. 3 is a sectional view taken along the line 3—3 in FIG. 2.
Figure 6:
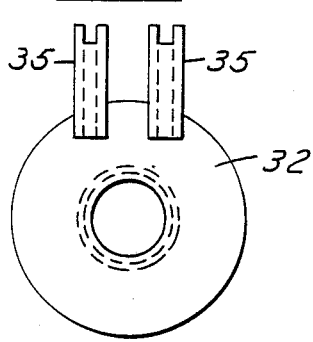
FIG. 6 is a view taken along the line 6—6 in FIG. 5.
Figure 7:
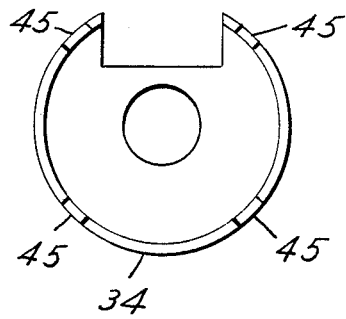
FIG. 7 is a view taken along the line 7—7 in FIG. 5.
Figure 8:
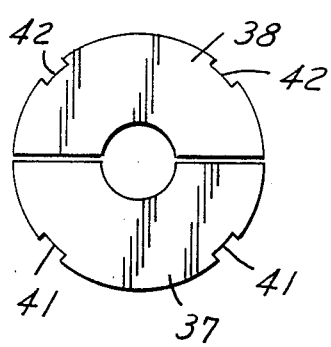
FIG. 8 is a view taken along the line 8—8 in FIG. 5.
Figure 9:
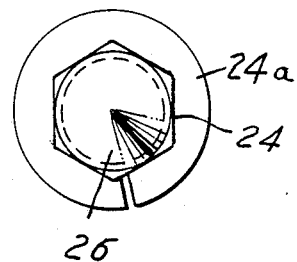
FIG. 9 is a view taken along the line 9—9 in FIG. 5.
Figure 10:
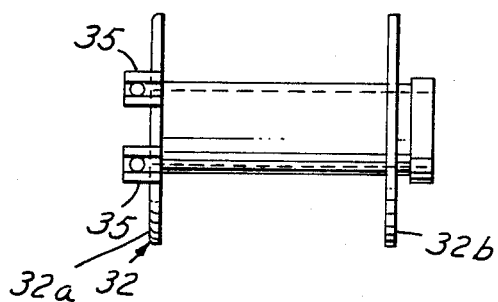
FIG. 10 is a view taken along the line 10—10 in FIG. 5.

Referring to FIGS. 1–10, the pneumatic solenoid valve embodying the invention comprises a body 10 that includes a first part 11 and a second part 12 assembled as presently described. Part 11 of the body 10 includes a first tubular projection 13 defining a first port A, a second tubular projection 14 defining a second port B and a third tubular projection 15 defining a third port C. The port A extends into the part 11 and has an axial portion 16 extending to a bore 17 in the body. The bore 17 includes a first seat 18 at one end adjacent the portion 16 of port A. The port B extends radially and intersects the bore 17 intermediate the ends of the bore 17 and more closely to the seat 18.

A coil assembly 20 is embedded in the body part 12, as presently described and a core 21 is mounted within the coil. The core 21 includes an axial passage 22 and has a second valve seat 23 adjacent the inner end of the passage 22 and a flange 21a as the other end. A plunger or armature 24 is provided in the bore 17 and has a first valve 25 at one end adapted to engage the seat 18 and a second valve 26 at the other end adapted to engage the seat 23. The valves 25, 26 are preferably provided with elastomeric caps 25a, 26a to facilitate the sealing of the valves 25, 26 on their respective seats 18, 23 respectively. The plunger 24 is preferably hexagonal in cross section. A coil spring 27 surrounds the plunger 24 and is interposed such that it engages a flange 24a on the plunger 24 to yieldingly urge the plunger 24 to the right as viewed in FIG. 2 to bring the valve 25 in engagement with the seat 18.

The solenoid valve further includes a tube 28 which is U-shaped and includes a long leg 29 a short leg 30 and intermediate connecting portion 31. The long leg 29 intersects the port C and the short leg 30 intersects the passage 22 thereby providing communication between the port C and the passage 22.

The coil assembly 20 includes a bobbin 32, a coil 33 wound on the bobbin 32 and a housing or can 34 surrounding the coil 33. The bobbin 32 includes spaced radial flanges 32a, b integral radially extending projections 35 for receiving fixed leads 36. The ends of the wire of the coil 33 are connected to the leads 36. End plates 37 and 38 are provided on bobbin 32.

Portions 45 of the housing or can 34 are extended through notches 41, 42 in the end plates 37, 38 and are bent over the outer surface thereof to hold the bobbin assembly, can 34 and core and end plate 37, 38 in assembled condition.

Referring to FIG. 5, in the manufacture of the solenoid valve, the body part 11 is first formed by injection molding from plastic material. The bobbin is also formed by injection molding of plastic material. The wire is wound on the bobbin 32 to form the coil 33, the fixed terminals 36 are inserted in the projections 35 and the ends of the coil are fixed thereto as by soldering. The end plates 37, 38 are positioned adjacent the flange 32b and in the groove 32c formed between the flange 32b and in the enlarged head 32d of the bobbin. The can 34 is telescoped over the bobbin, the notch 34a in the can provided clearance for the projections 35, then the core 21 is inserted within the bobbin. The plunger 24 and retaining ring 24a and spring 27 are inserted into the bore 17 of part 11. The coil assembly 20 is then positioned in the part 11 and the tube 28 is assembled thereto. This entire assembly is then placed into a mold for encapsulation by formation of the part 12 about a portion of the part 11 as well as the assembly 20.

The body parts 11, 12 are made of non-conductive, non-magnetic material, preferably plastic. The plunger 24 and core 21 are made of magnetic material and the bobbin 32 is made of non-conductive non-magnetic material, preferably plastic.

More specifically, typical materials which have produced satisfactory results comprise glass impregnated nylon for the body parts 11, 12 and bobbin 32; electro-plated cold rolled steel for the core 21; electro-plated cold rolled steel for the plunger 24; zinc plated cold rolled steel for the can 34; and cartridge brass for the tube 28.

In operation, vacuum or pressure is supplied to port A or port C, and port B is a common port. With the coil 33 de-energized, the plunger 24 is held in position by spring 27, such that the first valve 25 engages the first valve seat 18 and the ports B and C are in communication. When the coil 33 is energized, the plunger is moved to the left as viewed in FIG. 2, thereby moving the first valve 25 away from the first valve seat 18 and moving the second valve 26 into engagement with the second valve seat 23. This provides communication between ports A and B and closes communication to port C through tube 28.

Energization of the coil 33 is described as a pull-in. Drop-out is described as the amount that the coil must be de-energized to cause the plunger to drop out and seal off the port A.

It has been found that a vacuum solenoid made in accordance with the invention meets the aforementioned requirements. In operation in a vacuum situation, ports A and C are selectively provided with vacuum and port B is a common port. When the valve is utilized as a pressure valve, ports A and C are selectively provided with pressure and port B is a common port.

It can be seen that when the solenoid is energized, the plunger stops at the magnetic pole face so that the maximum mechanical force is provided and any magnetic air gaps are eliminated which might have provided for higher reluctance except for the thin elastomeric cap wall. Further there is no need for a cavity for the spring in the plunger and/or the core which would also increase the reluctance and adversely affect the mechanical force.

The construction of the pneumatic solenoid valve also reduces the number of parts and shortens the labor time and fabrication cost.

It can thus be seen that there has been provided a pneumatic solenoid valve which meets the desired requirements and has improved endurance; improved alignment of sealing surfaces; less reluctance and greater mechanical force for sealing; results in more positive action; utilizes fewer parts; is less costly to fabricate and can be manufactured with greater productivity.

What is claimed:

1. The method of forming a pneumatic solenoid valve which comprises molding a first body part of plastic material having a bore, a first passage intersecting one end of the bore, the bore defining a first seat adjacent one end, the body having a second passage intersecting the bore intermediate its ends and having a third passage, forming a bobbin of plastic material, winding wire on said bobbin to form a coil, providing fixed terminals to said coil, providing a housing over said bobbin and coil, inserting a plunger and spring into bore of said first part, positioning the assembly of the bobbin coil terminals and housing in the first part, connecting a tube which is U-shaped between the fourth passage and the third passage, and then molding a second part in section about a portion of the first part and embedding therein the bobbin, coil, core, plunger and tube.

2. A solenoid valve for controlling pneumatic vacuum or pressure comprising a plastic body made of non-conductive, non-magnetic material, said body having a bore, said body having a first passage extending from the exterior of said body and intersecting one end of said bore, said body defining a first integral seat adjacent said one end of said bore which intersects said first passage, said body having a second passage extending from the exterior of said body and intersecting the bore intermediate its ends, said body having a third passage extending from the exterior of said body, a core, a coil surrounding said core and embedded in said body, said body having contacts embedded therein connected to said coil and projecting externally of said body, said core having a fourth passage therethrough axially aligned with said bore and intersecting the other end of said bore, a tube embedded in said body providing communication between said fourth passage and said third passage, said tube being generally U-shaped and having a long leg and a short leg connected by an intermediate portion, the long leg communicating with the third passage and the short leg communicating with the fourth passage in the core, said core defining a second integral seat adjacent the other end of said bore, a single plunger provided in said bore having a first conical valve at one end adapted to engage said first seat and a second conical valve at the other end adapted to engage said second seat,
said plunger having therein elastomeric caps on its conical ends for facilitating sealing adjacent said seats,
said body completely surrounding and embedding said tube such that the only openings to the exterior comprise said first, second and third passages,
spring means yielding urging said first valve on said plunger into engagement with said first seat,
said coil including a bobbin, a coil wound on said bobbin, a housing, end plates on said housing defining an opening such that the plunger can extend therethrough,
one of said end plates including said contacts,
said body comprising a first part having said first, second and third passages and said bore therein and a second part molded in situ about a portion of the first part and engaging said first part and embedding therein said coil, core, plunger and tube.

* * * * *